(12) United States Patent
Chakraborty et al.

(10) Patent No.: US 10,873,488 B2
(45) Date of Patent: Dec. 22, 2020

(54) INTRA-PACKET RATE ADAPTATION FOR HIGH CAPACITY

(71) Applicant: QUALCOMM Incorporated, San Diego, CA (US)

(72) Inventors: Tuhin Subhra Chakraborty, Bangalore (IN); Rajat Sapra, Bangalore (IN); Karthik Muralidhar, Bangalore (IN); Hari Krishna Boddapati, Bangalore (IN); Swaroop Venkatesh, San Ramon, CA (US); Ashutosh Deepak Gore, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 16/254,291

(22) Filed: Jan. 22, 2019

(65) Prior Publication Data

US 2020/0235971 A1 Jul. 23, 2020

(51) Int. Cl.
*H04L 27/26* (2006.01)
*H04B 7/0413* (2017.01)

(52) U.S. Cl.
CPC ....... *H04L 27/2604* (2013.01); *H04B 7/0413* (2013.01)

(58) Field of Classification Search
CPC .......................... H04L 27/2604; H04B 7/0413
USPC ....................................................... 370/310
See application file for complete search history.

(56) References Cited

U.S. PATENT DOCUMENTS

| 2004/0174856 | A1  | 9/2004  | Brouet et al. |            |
|--------------|-----|---------|---------------|------------|
| 2007/0291873 | A1* | 12/2007 | Saito         | H04B 1/04  |
|              |     |         |               | 375/298    |
| 2010/0067546 | A1* | 3/2010  | Mishra        | H04L 47/20 |
|              |     |         |               | 370/472    |
| 2012/0218982 | A1* | 8/2012  | Lee           | H04L 1/06  |
|              |     |         |               | 370/338    |
| 2018/0213365 | A1* | 7/2018  | Yi            | H04W 4/40  |

FOREIGN PATENT DOCUMENTS

| WO | 2016057431 A1 | 4/2016 |
| WO | 2018017432 A1 | 1/2018 |
| WO | 2018068241 A1 | 4/2018 |

OTHER PUBLICATIONS

International Search Report and Written Opinion—PCT/US2019/067380—ISA/EPO—dated Apr. 3, 2010.

\* cited by examiner

*Primary Examiner* — Peter G Solinsky
(74) *Attorney, Agent, or Firm* — Qualcomm IP Dept.; James Hunt Yancey, Jr.

(57) ABSTRACT

Wireless communications systems and methods related to intra-packet rate adaptation are provided. A first wireless communication device communicates, with a second wireless communication device, an intra-packet modulation coding scheme (MCS) switching configuration. The first wireless communication device receives, from the second wireless communication device, a communication signal including a first data packet based on the intra-packet MCS switching configuration. The first data packet includes at least a first portion encoded by a first MCS and a second portion encoded by a second MCS different from the first MCS.

30 Claims, 10 Drawing Sheets

INTRA-PACKET RATE ADAPTATION FOR HIGH CAPACITY

TECHNICAL FIELD

This application relates to wireless communication systems, and more particularly to performing intra-packet rate adaptation. Certain embodiments can enable and provide solutions and techniques for wireless communication devices to switch over to a higher order modulation coding scheme (MCS) within a packet to achieve a higher data rate.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Quadrature amplitude modulation (QAM) is commonly used in wireless communication systems to modulate data bits onto frequency carriers. Some examples of QAMs may include 16-QAM, 64-QAM, 256-QAM, 1024-QAM, and 4096-QAM. To achieve a higher bit rate or a higher capacity, a higher order QAM may be used. However, high order QAMs, such as 1024-QAM and 4096-QAM, require a receiver to have a substantially low error vector magnitude (EVM) due to the high-density constellation. Some wireless communication systems may apply rate adaptation to improve capacity. In other words, the modulation order may be adapted to channel variations in a communication link. However, the selection or determination of a modulation order for a pair of transmitter and receiver communicating over a link is typically based on the worst EVM for the link, and thus may not be optimal. In some multiple-input multiple-output (MIMO) systems, different streams may utilize different modulation orders. However, the selection or determination of a modulation order for each stream is also based on the worst EVM for the corresponding stream over the link.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for improving link capacity by performing rate adaptation within a data packet or a transport block (TB). For example, a transmitter may transmit a portion of a data packet using an initial modulation coding scheme (MCS) and switches to transmit a remaining portion of the data packet using a higher order MCS. The time when the transmitter switches to the higher order MCS may be negotiated with a corresponding receiver. The receiver may determine the intra-packet MCS switching time based on an error vector magnitude (EVM) measurement of the receiver. The receiver may decode the first portion of the data packet based on the initial EVM and the remaining portion of the data packet based on the higher order MCS the MCS switching time.

For example, in an aspect of the disclosure, a method of wireless communication includes communicating, by a first wireless communication device with a second wireless communication device, an intra-packet modulation coding scheme (MCS) switching configuration. The method also includes receiving, by the first wireless communication device from the second wireless communication device, a communication signal including a first data packet based on the intra-packet MCS switching configuration, where the first data packet includes at least a first portion encoded by a first MCS and a second portion encoded by a second MCS different from the first MCS.

In an additional aspect of the disclosure, a method of wireless communication includes communicating, by a first wireless communication device with a second wireless communication device, an intra-packet modulation coding scheme (MCS) switching configuration. The method also includes transmitting, by the first wireless communication device to the second wireless communication device, a communication signal including a first data packet based on the intra-packet MCS switching configuration, where the first data packet includes at least a first portion encoded by a first MCS and a second portion encoded by a second MCS different from the first MCS.

In an additional aspect of the disclosure, an apparatus includes a transceiver configured to communicate, with a wireless communication device, an intra-packet modulation coding scheme (MCS) switching configuration. The transceiver is also configured to receive, from the wireless communication device, a communication signal including a first data packet based on the intra-packet MCS switching configuration, the first data packet including at least a first portion encoded by a first MCS and a second portion encoded by a second MCS different from the first MCS.

In an additional aspect of the disclosure, an apparatus includes a transceiver configured to communicate, with a wireless communication device, an intra-packet modulation coding scheme (MCS) switching configuration. The transceiver is also configured to transmit, to the wireless communication device, a communication signal including a first data packet based on the intra-packet MCS switching configuration, the first data packet including at least a first portion encoded by a first MCS and a second portion encoded by a second MCS different from the first MCS.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
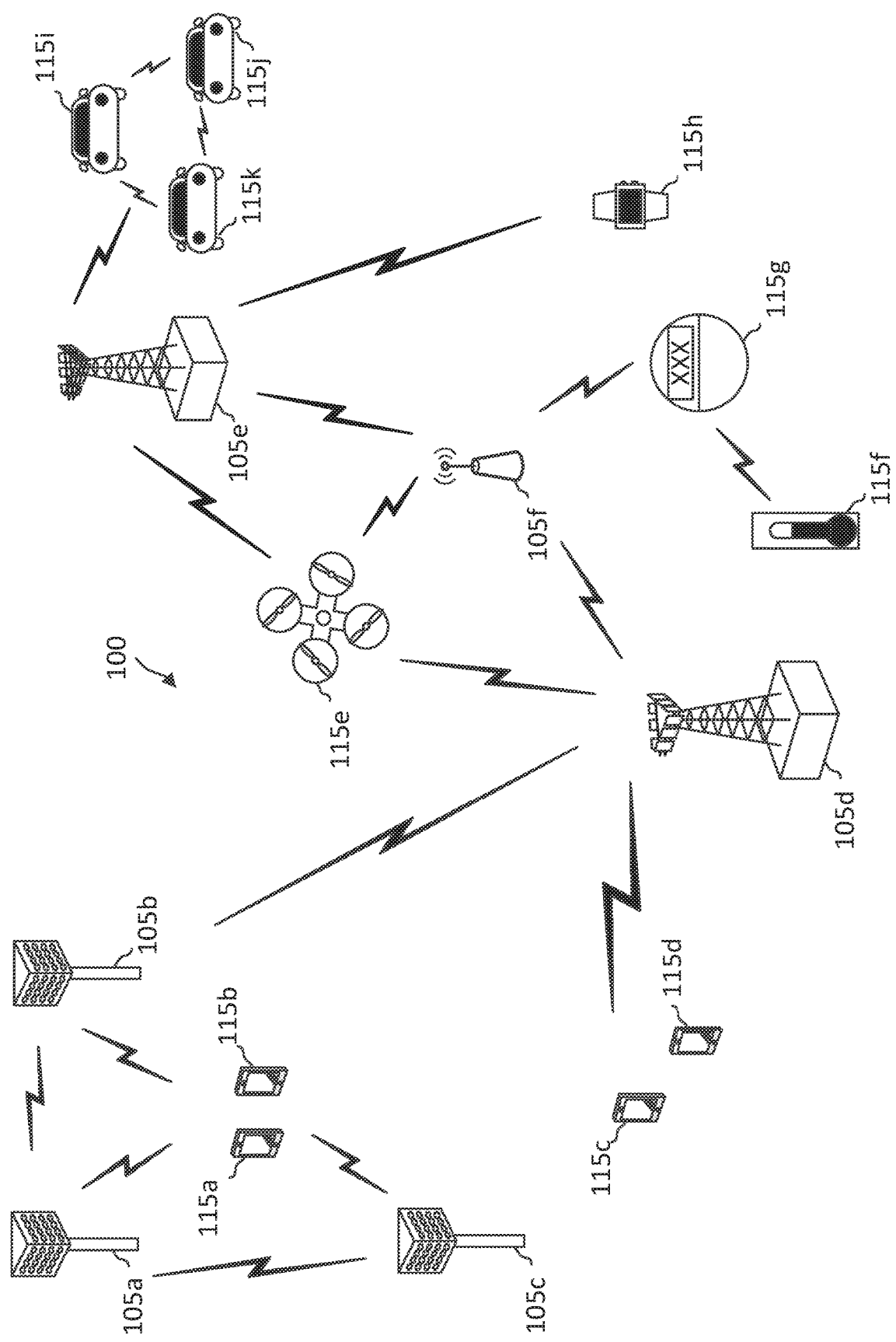
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for performing intra-packet rate adaptation. In the disclosed embodiments, a transmitter may select an initial modulation coding scheme (MCS) for transmitting a data packet to a receiver. The transmitter may increase the MCS to a next MCS order within the data packet, for example, after a duration of time. In other words, a portion of the data packet may be transmitted using the initial MCS and a remaining portion of the data packet may be transmitted using a MCS that is higher than the initial MCS. The duration may be dependent on the receiver design (e.g., the convergence time of the receiver's tracking algorithms), the application associated with the data packet, and/or the traffic type associated with the data packet. The receiver may determine the MCS switchover time (MST) based on a receiver error vector magnitude (EVM) parameter. The receiver may report timing information associated with the MST to the transmitter. The receiver may decode a portion of the communication signal corresponding to the MST based on the first MCS. The receiver may decode a remaining portion of the communication signal based on the second MCS. In an embodiment, the transmitter may transmit a single communication signal including multiple streams (e.g., carrying one or more data packets) using MIMO transmission. The transmitter may apply intra-packet rate adaptation (a MCS switchover) to each spatial stream for the MIMO transmission. The use of intra-packet rate adaptation to increase an MCS to a higher order within a packet can increase data rate and/or link capacity. While the disclosed embodiments are described in the context of OFDM systems, the disclosed embodiments can be applied to other systems such as SC-FDM systems.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the BS 105 may communicate with a UE 115 using a certain modulation coding scheme (MCS) order for UL communications and a certain MCS order for DL communications. The BS 105 may determine the UL MCS order and the DL MCS order independently based channel measurements in the corresponding links. The BS 105 may perform rate adaptation to achieve a higher data rate or a higher capacity. In other words, different UL MCS orders and/or different DL MCS order may be selected at different time for different packets, for example, based on channel variations. According to the embodiments of the present disclosure, the BS 105 and the UE 115 may communicate with each other using intra-packet rate adaptation instead of per packet rate adaptation to further improve data rate and/or capacity. Mechanisms for intra-packet rate adaptation are described in greater detail herein.

Figures 2, 3:
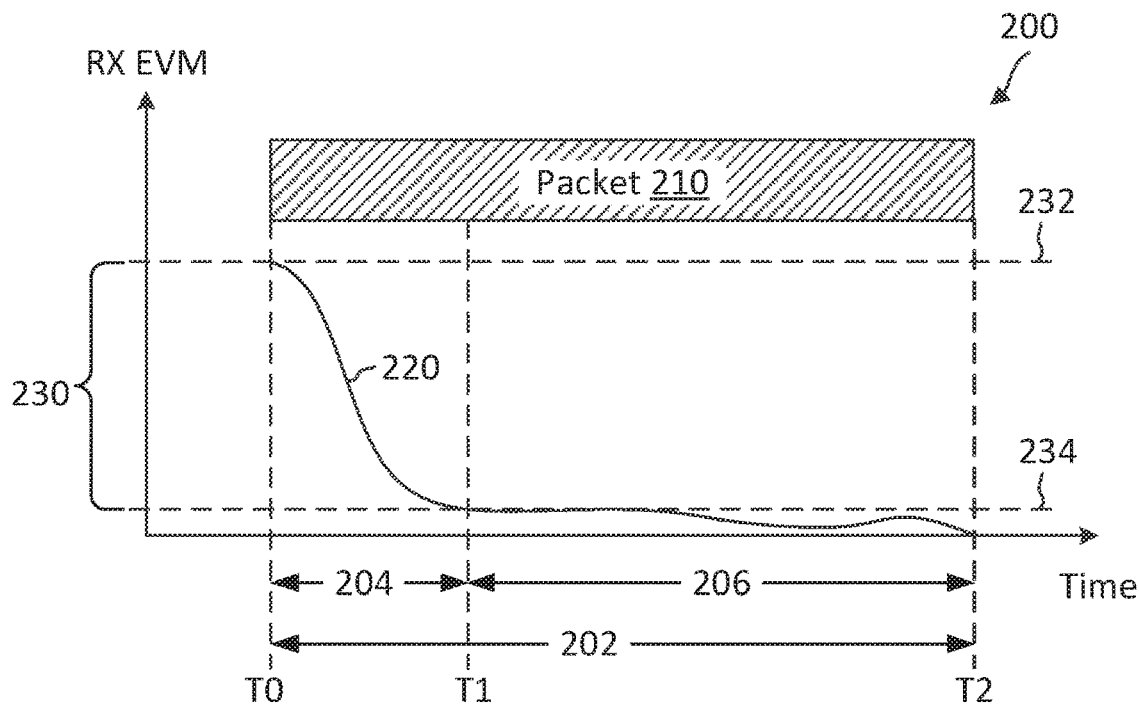
FIG. 2 is a graph illustrating receive error vector magnitude (EVM) across a packet duration according to some embodiments of the present disclosure.
FIG. 3 is a table illustrating EVM requirements for various modulation coding scheme (MCS) according to some embodiments of the present disclosure.

FIG. 2 is a graph 200 illustrating receive EVM across a packet duration according to some embodiments of the present disclosure. In FIG. 2, the x-axis represents time in some constant units and the y-axis represents receive (RX) EVM in some constant units. The plot 220 shows the EVM measured at a certain receiver during the reception of a packet 210 as a function of time. The receiver may correspond to a BS 105 or a UE 115 in the network 100.

As shown, the packet 210 has a duration 202. At time T0, the receiver begins to receive the packet 210 and the reception of the packet 210 is completed at time T2. The receiver has a EVM 232 at the beginning of the reception (e.g., at time T0). The receiver's EVM improves or reduces to a EVM 234 (e.g., at time T1). The EVM maintains at about the same level until the end of the packet (e.g., at time T2). As can be observed, the EVM has an improvement or reduction 230 over the duration 204 and maintains at about the same EVM 234 for the remaining packet duration 206.

The EVM reduction 230 is mainly due to the convergence of the tracking algorithms at the receiver. For example, the receiver may perform timing-offset and/or carrier frequency-offset (CFO) tracking, where the tracking may determine time and/or frequency errors or offsets between the receiver and the transmitter and automatically adjust the receiver's clock system and/or frontend to match the time and/or frequency of the transmitter. Additionally, the receiver may estimate direct current (DC) error and/or in-phase quadrature-phase (I/Q) imbalance in the receiver's frontend and perform tracking and correction. Further, the receiver may implement channel estimation algorithm to estimate the channel response (e.g., including phases and magnitudes). The channel estimates can also improve over time. In general, the receiver's algorithms converge to an optimal point after a duration of time.

The amount of EVM reduction 230 may vary depending on the applications and/or the implementations of the receiver. In some instances, the EVM reduction can be about 2 decibels (dB) to about 3 dB. A 2-3 dB EVM reduction can be significant in terms of MCS order selection. The selection of MCS order with respect to RX EVM is shown in FIG. 3.

FIG. 3 is a table 300 illustrating EVM requirements for various MCS according to some embodiments of the present disclosure. The table 300 may be employed by BSs such as the BSs 105 and UEs such as the UEs 115 in a network such as the network 100. In particular, a BS may determine or select a MCS order for communications with a UE using the table 300.

The table 300 illustrates various example combinations of modulation orders and coding rates and a EVM requirement for each combination of modulation order and coding rate. The modulation orders include quadrature phase-shift keying (QPSK), 16-QAM, 64-QAM, 256-QAM, 1024-QAM, and 4096-QAM. The coding rates include ½, ⅔, ¾, and ⅚. The table 300 also assign an MCS index for identifying each combination of modulation order and coding rate. As shown, a lower EVM can support a higher MCS order. A higher MCS order refers to a higher modulation order and/or a higher coding rate.

As an example, when a receiver can support a EVM of about −33 dB, the transmitter may transmit a packet to the receive using a 256-QAM with a coding rate of ⅚ (a MCS index 9) in row 360. As can be observed from the table 300, a 2-3 dB EVM improvement can allow a transmitter to increase the MCS order to a next MCS order as shown by the dashed arrow 302. In another example, a receiver may begin (e.g., at time T0) with a EVM of about −21.9 dB, and thus a transmitter may select a MCS index 4 in row 310. However, after a few symbols (e.g., at time T1), the receiver may reach a EVM of about −22 dB, and thus the transmitter can increase the MCS order to a next MCS order (e.g., MCS index 5) in row 320.

Accordingly, embodiments of the present disclosure provide techniques for performing intra-packet rate adaptation. In some scenarios, adaptation can be based on the observations of the RX EVM improvement within a packet in the graph 200 and/or the RX EVM requirements for the MCS orders in the table 300. The present disclosure provides techniques for a receiver to report a receiver convergence time (e.g., the duration 204) and for a transmitter to switchover to a higher order MCS (e.g., a next MCS order) within a packet after the receiver convergence time. The receiver convergence time may be referred to as a MCS switchover time (MST) and be in any suitable units. In some embodiments, the MST can be in units of one or more OFDM symbols. In other words, the MST is a duration from the beginning of a packet to a time within the packet where the receiver can reach a certain EVM improvement that can allow a MCS order switchover or increase. In some scenarios, adaptation can be said to occur within a transmission time interval (TTI). That is, intra-TTI rate adaptation enables MCS to be updated at the granularity of a single OFDM symbol in some scenarios (e.g., OFDM symbols in a packet). Adaptation within a TTI (as opposed to across TTIs) provides techniques that can be precise down to one or more symbols within a TTI or slot or frame of a packet. In some scenarios, a packet may include one or more of TTI elements.

Figure 4:
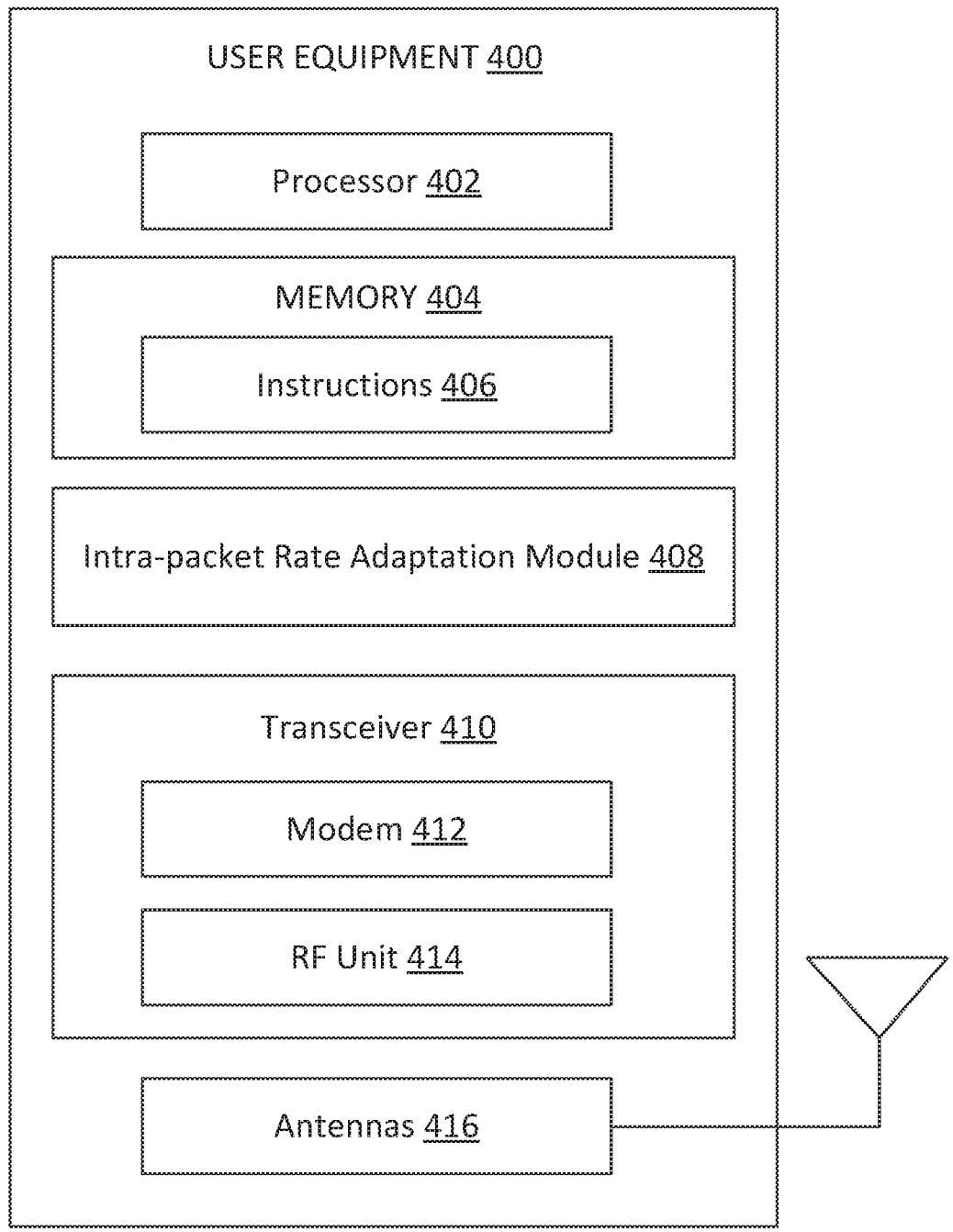
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 in the network 100 as discussed above. As shown, the UE 400 may include a processor 402, a memory 404, an intra-packet rate adaptation module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIGS. 6-11. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The intra-packet rate adaptation module 408 may be implemented via hardware, software, or combinations thereof. For example, the intra-packet rate adaptation module 408 may be implemented as a processor, circuit, and/or instructions 406 stored in the memory 404 and executed by the processor 402. In some examples, the intra-packet rate adaptation module 408 can be integrated within the modem subsystem 412. In some examples, the intra-packet rate adaptation module 408 may be implemented by a DSP within the modem subsystem 412. The intra-packet rate adaptation module 408 may be used for various aspects of the present disclosure, for example, aspects of FIGS. 6-11. The intra-packet rate adaptation module 408 is configured to transmit an intra-packet MCS switchover capability report, determine a MST (e.g., based on a receive EVM parameter), report the MST, receive a MCS switchover trigger, receive a first communication signal including a single data packet encoded with a MCS switchover (e.g., according to the MST), recover data from the first communication signal based on the MCS switchover, receive a second communication signal including multiple streams each encoded with a MCS switchover (e.g., according to the MST), and/or receive data from the second communication signal based on the MCS switchover.

The intra-packet rate adaptation module 408 is further configured to receive an intra-packet MCS switchover capability report from a receiver (e.g., one of the BSs 105, BS 500, UEs 116, or UE 400), or receive a MST, transmit a MCS switchover trigger, transmit a first communication signal including a single data packet encoded with a MCS switchover (e.g., according to the MST), and/or transmit a second communication signal including multiple streams each encoded with a MCS switchover (e.g., according to the MST). Mechanisms for intra-packet rate adaptation are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the intra-packet rate adaptation module 408 according to a modulation and coding scheme (MCS), e.g., a low-density parity check (LDPC) coding scheme, a turbo coding scheme, a polar coding scheme, a convolutional coding scheme, a digital beamforming scheme, etc.

In some instances, the transceiver 410 may be an OFDM transceiver and may coordinate with the intra-packet rate adaptation module 408 to implement aspects of FIGS. 6-11 for intra-packet rate adaptation. In some other instances, the transceiver 410 may be an SC-FDM transceiver and may coordinate with the intra-packet rate adaptation module 408 to implement aspects of FIGS. 6-11 for intra-packet rate adaptation. An SC-FDM transceiver is substantially similar to an OFDM transceiver. The SC-FDM transceiver differs from the OFDM transceiver by having an additional discrete Fourier transform (DFT) block before an inverse fast Fourier transform (IFFT) block at a transmitter and an additional DFT block after a fast Fourier transform (FFT) block at the receiver. Additionally, an SC-FDM transceiver may track a channel on a per carrier basis instead of tracking a channel on a per subcarrier basis as in an OFDM-transceiver.

The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement RATs.

Figure 5:
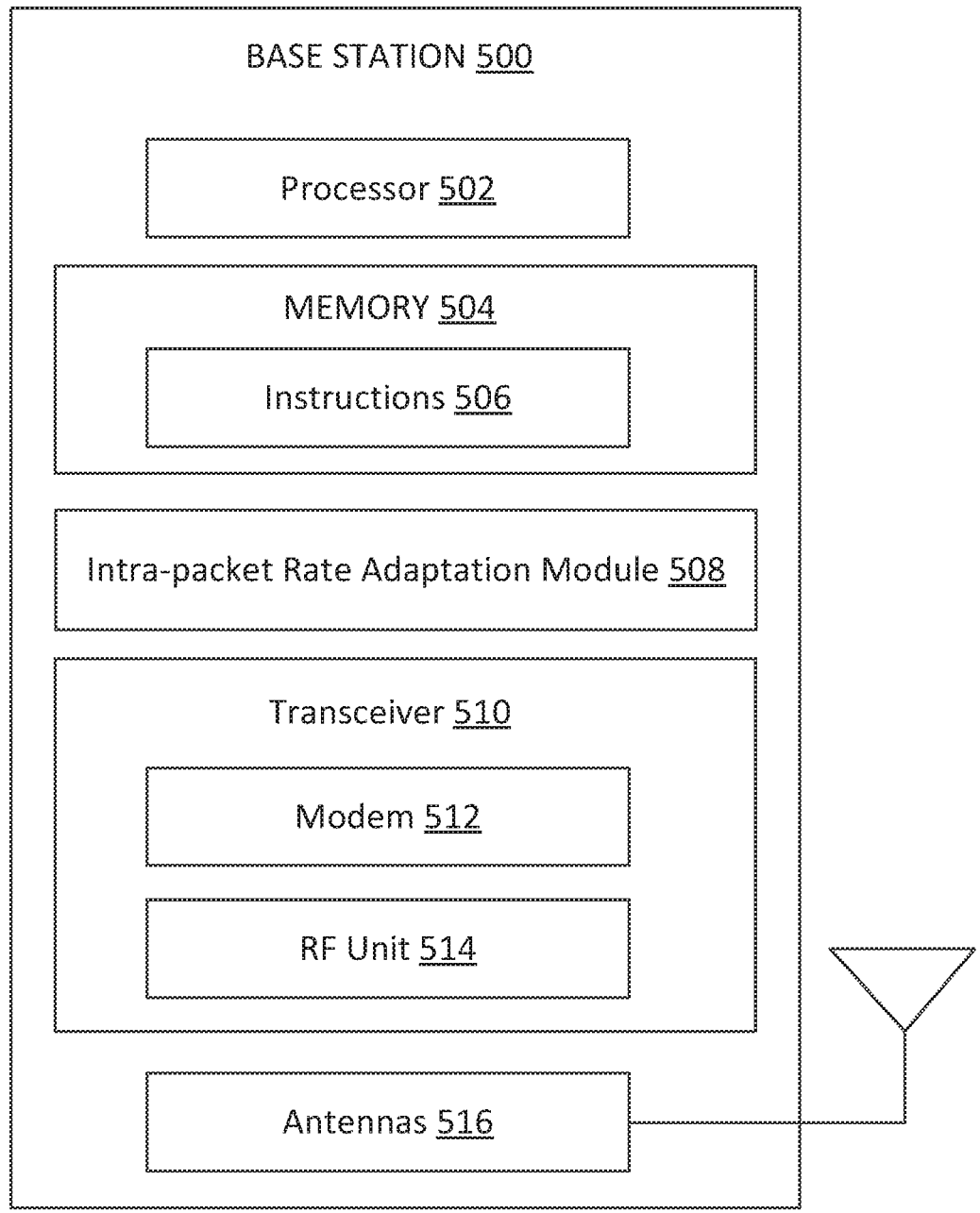
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 in the network 100 as discussed above. A shown, the BS 500 may include a processor 502, a memory 504, an intra-packet rate adaptation module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIG. 6-11. Instructions 506 may also be referred to as code, which may be interpreted broadly to include any type of computer-readable statement(s) as discussed above with respect to FIG. 4.

The intra-packet rate adaptation module 508 may be implemented via hardware, software, or combinations thereof. For example, the intra-packet rate adaptation module 508 may be implemented as a processor, circuit, and/or instructions 506 stored in the memory 504 and executed by the processor 502. In some examples, the intra-packet rate adaptation module 508 may be implemented by a DSP within the modem subsystem 512. The intra-packet rate adaptation module 508 may be used for various aspects of the present disclosure, for example, aspects of FIG. 6-11. The intra-packet rate adaptation module 508 is configured to transmit an intra-packet MCS switchover capability report, determine a MST (e.g., based on a receive EVM parameter), report the MST, receive a MCS switchover trigger, receive a first communication signal including a single data packet encoded with a MCS switchover (e.g., according to the MST), recover data from the first communication signal based on the MCS switchover, receive a second communication signal including multiple streams each encoded with a MCS switchover (e.g., according to the MST), and/or receive data from the second communication signal based on the MCS switchover.

The intra-packet rate adaptation module 508 is further configured to receive an intra-packet MCS switchover capability report from a receiver (e.g., one of the BSs 105, BS 500, UEs 116, or UE 400), or receive a MST, transmit a MCS switchover trigger, transmit a first communication signal including a single data packet encoded with a MCS switchover (e.g., according to the MST), and/or transmit a second communication signal including multiple streams each encoded with a MCS switchover (e.g., according to the MST). Mechanisms for intra-packet rate adaptation are described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a polar coding scheme, a convolutional coding scheme, a digital beamforming scheme, etc.

In some instances, the transceiver 510 is an OFDM transceiver and may coordinate with the intra-packet rate adaptation module 508 to implement aspects of FIGS. 6-11 for intra-packet rate adaptation. In some other instances, the transceiver 510 is an SC-FDM transceiver and may coordinate with the intra-packet rate adaptation module 508 to implement aspects of FIGS. 6-11 for intra-packet rate adaptation. An SC-FDM transceiver is substantially similar to an OFDM transceiver. The SC-FDM transceiver differs from the OFDM transceiver by having an additional DFT block before an IFFT block at a transmitter and an additional DFT block after an FFT block at the receiver. Additionally, an SC-FDM transceiver may track a channel on a per carrier basis instead of tracking a channel on a per subcarrier basis as in an OFDM-transceiver.

The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115, 215, or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 500 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement RATs.

Figure 6:
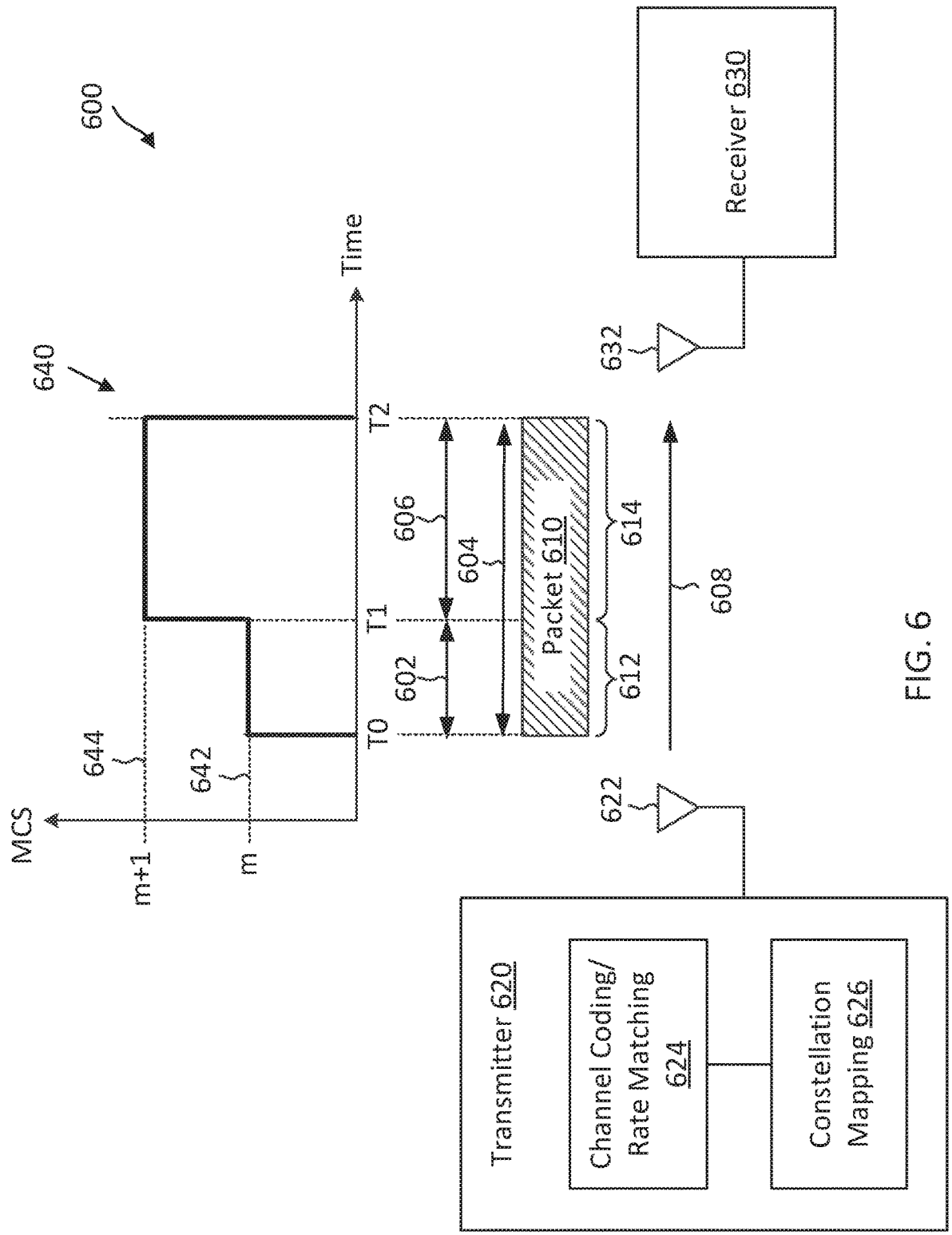
FIG. 6 is a signaling diagram illustrating an intra-packet rate adaptation method according to some embodiments of the present disclosure.

FIG. 6 illustrates a wireless communication system 600 implementing intra-packet rate adaptation according to some embodiments of the present disclosure. The system 600 may correspond to a portion of the network 100. The system 600 includes a transmitter 620 and a receiver 630. The transmitter 620 may correspond to the transmitter of one of the BSs 105 or the BS 500 and the receiver 630 may correspond to the receiver of one of the UEs 115 or the UE 400. Alternatively, the transmitter 620 may correspond to the transmitter of one of the UEs 115 or the UE 400 and the receiver 630 may correspond to the receiver of one of the BSs 105 or the BS 500. The transmitter 620 includes an antenna 622 (e.g., the antennas 416 and 516). The receiver 630 includes an antenna 632 (e.g., the antennas 416 and 516). The transmitter 620 generates a communication signal 608 carrying a packet 610 (e.g., the packet 210) and transmits the communication signal 608 to the receiver 630 via the antenna 622 over a channel. The receiver 630 receives the communication signal 608 and recovers the packet 610 from the communication signal 608.

The transmitter 620 generates the communication signal 608 using intra-packet rate adaptation as shown in the plot 640. In the plot 640, the x-axis represents time in some constant units and the y-axis represents MCS indices similar to the MCS indices 0-13 shown in the table 300. As shown by the plot 640, the transmitter 620 encodes a portion 612 of the data packet 610 using a MCS index 642, denoted as m, for example, selected from the table 300 based on the channel measurement reported by the receiver 630. The transmitter 620 switchovers to encode a remaining portion 614 of the data packet 610 using a next MCS index 644, denoted as (m+1). As an example, the MCS index 642 may correspond to a MCS index 11 in the table 300 and the MCS index 644 may correspond to a MCS index 12 in the table 300. In another example, the MCS index 642 may correspond to a MCS index 4 in the table 300 and the MCS index 644 may correspond to a MCS index 5 in the table 300. The packet 610 may be transmitted over a duration 604 from time T0 to T2. The MCS index switchover may occur at time T1 after a duration 602 from the beginning time T0. The portion 612 of the data packet 610 is transmitted from time T0 to T1 using MCS index 642. The remaining portion 614 of the data packet 610 is transmitted from time T1 to T2 using MCS index 644.

The receiver 630 may provide the transmitter 620 with the duration 602, for example, in units of OFDM symbols. As an example, the duration 602 may include K symbols, where K may be 2, 3, or more. The receiver 630 may determine the duration 602 based on the receiver 630 implementations and/or the traffic type or application associated with the data packet 610. Mechanisms for exchanging or reporting intra-packet rate adaptation support are described in greater detail herein.

In an embodiment, the transmitter 620 includes a channel coding and rate matching unit 624 and a constellation mapping unit 626. The transmitter 620 receives the packet 610 from a higher layer (e.g., the medium access control (MAC) layer) in the form of a transport block (TB) including a plurality of data information bits.

The channel coding and rate matching unit 624 is configured to encode the TB based on a certain channel coding scheme (e.g., turbo code, LDPC, and/or polar code) and performs rate matching based on a certain code rate to generate coded bits (e.g., forming a codeword). The constellation mapping unit 626 is configured to map or convert the coded bits into modulation symbols based on a certain modulation order. The transmitter 620 configures the channel coding and rate matching unit 624 and the constellation mapping unit 626 such that a portion of the TB (corresponding to the duration 602 or K symbols) is encoded based on a coding rate (e.g., ½, ⅔, ¾, or ⅚) and a modulation (e.g., 16-QAM, 64-QAM, 256-QAM, 1024-QAM, or 4096-QAM) of the MCS index 642 and a remaining portion of the TB (corresponding to the duration 606) is encoded based on a coding rate and a modulation of the MCS index 644.

As an example, the MCS index 642 corresponds to MCS index 4 (16-QAM with a code rate of ¾) and the MCS index 644 corresponds to MCS index 5 (64-QAM with a code rate of ⅔) in the table 300. The channel coding and rate matching unit 624 generates N1 coded bits from a portion of the TB or the data packet 610 based on a ¾ code rate and the constellation mapping unit 626 maps the N1 code bits to 16-QAM modulation symbols. The 16-QAM modulation symbols are carried by the first K OFDM symbols (e.g., in the duration 602). The channel coding and rate matching unit 624 generates N2 coded bits from a remaining portion of the TB or the data packet 610 based on a ⅔ code rate and the constellation mapping unit 626 maps the N2 code bits to 64-QAM modulation symbols. The 64-QAM modulation symbols are carried by remaining OFDM symbols in the duration 606. While not shown, the transmitter 620 can include other units that perform cyclic redundancy correction (CRC) generation and attachment, scrambling, resource mapping, inverse fast Fourier transform (IFFT), and/or cyclic-prefix (CP) appending.

Upon receiving the communication signal 608, the receiver 630 may demodulate and/or decode the first K symbols based on the MCS index 642 and demodulation and/or decode the remaining symbols based on the MCS index 644.

As can be observed from the plot 640, the MCS order is increased from m to (m+1) within the packet 610. Accordingly, the present disclosure can provide a higher data rate or capacity by exploiting or taking advantage of receiver algorithm convergence.

Figure 7:
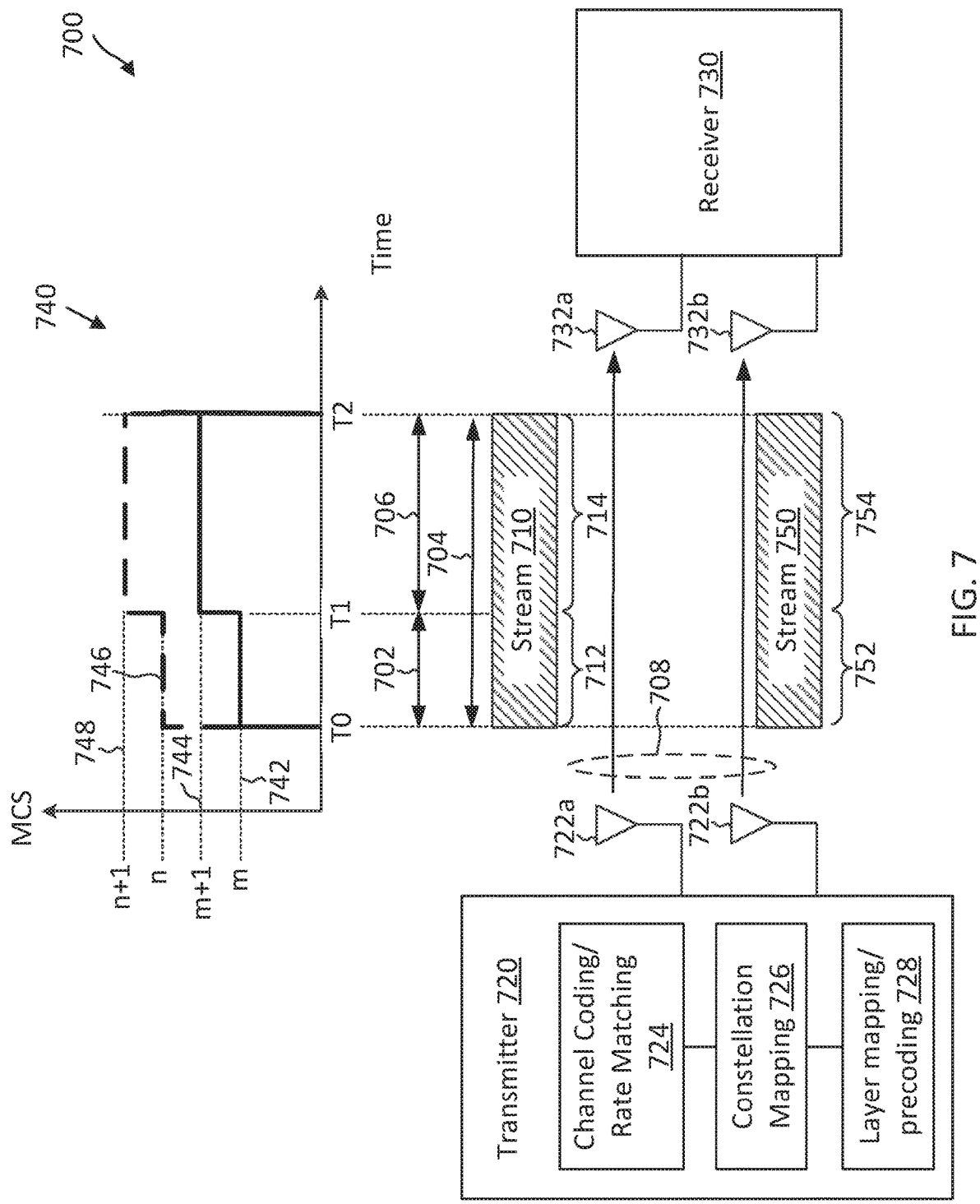
FIG. 7 illustrates a wireless communication system implementing intra-packet rate adaptation according to some embodiments of the present disclosure.

FIG. 7 illustrates a wireless communication system 700 system implementing intra-packet rate adaptation according to some embodiments of the present disclosure. The system 700 may correspond to a portion of the network 100. The system 700 employs substantially similar intra-packet rate adaptation mechanisms as in the system 600. However, the system 700 is a multiple-input multiple-output (MIMO) system, where intra-packet rate adaptation is performed per spatial layer or stream. As shown, the system 700 includes a transmitter 720 and a receiver 730. The transmitter 720 may correspond to the transmitter of one of the BSs 105 or the BS 500 and the receiver 730 may correspond to the receiver of one of the UEs 115 or the UE 400. Alternatively, the transmitter 720 may correspond to the transmitter of one of the UEs 115 or the UE 400 and the receiver 730 may correspond to the receiver of one of the BSs 105 or the BS 500. The transmitter 720 includes a plurality of antennas 722 (e.g., the antennas 416, 516, 622, and 632). The receiver 730 includes a plurality of antennas 732 (e.g., the antennas 416, 516, 622, and 632). For simplicity of illustration and discussion, FIG. 7 illustrates the transmitter 720 with two antennas 722a and 722b and the receiver 730 with two antennas 732a and 732b. However, each of the transmitter 720 or the receiver 730 can include any suitable number of antennas (e.g., about 4, 8 or more). The transmitter 720 generates a communication signal 708 including a spatial stream 710 and a spatial stream 750 carrying a data packet (e.g., the data packets 210 and 610). The transmitter 720 transmits the communication signal 708 to the receiver 730 via the antennas 722 over a MIMO channel. The receiver 730 receives the communication signal 708 and recovers the spatial streams 710 and 750 from the communication signal 708.

The transmitter 720 generates the communication signal 708 using intra-packet rate adaptation as shown in the plot 740. In the plot 740, the x-axis represents time in some constant units and the y-axis represents MCS indices similar to the MCS indices 0-13 shown in the table 300. As shown by the plot 740, the transmitter 720 generates a portion 712 of the spatial stream 710 using a MCS index 742, denoted as m, for example, selected from the table 300 based on the channel measurement reported by the receiver 730. The transmitter 720 switchovers to generate a remaining portion 714 of the spatial stream 710 using a next MCS index 744, denoted as (m+1). The transmitter 720 generates a portion 752 of the spatial stream 750 using a MCS index 746, denoted as n, for example, selected from the table 300 based on the channel measurement reported by the receiver 730. The transmitter 720 switchovers to generate a remaining portion 754 of the spatial stream 750 using a next MCS index 748, denoted as (n+1). The MCS index 742 and 746 may be the same or different. Similarly, the MCS orders 744 and 748 may be the same or different. As an example, the MCS orders 742, 744, 746, and 748 may correspond to MCS indices 8, 9, 10, and 11, respectively, in the table 300.

The spatial streams 710 and 750 may be transmitted over a duration 704 from time T0 to T2. The MCS order switchover may occur at time T1 after a duration 702 from the beginning time T0. The portion 712 of the spatial stream 710 is transmitted from time T0 to T1 using MCS index 742. The remaining portion 714 of the spatial stream 710 is transmitted from time T1 to T2 using MCS index 744. The portion 752 of the spatial stream 750 is transmitted from time T0 to T1 using MCS index 746. The remaining portion 754 of the spatial stream 750 is transmitted from time T1 to T2 using MCS index 748. In an embodiment, the spatial stream 710 may be transmitted by the transmitter 720 via the antenna 722a and received by the receiver 730 via the antenna 732a, and the spatial stream 750 may be transmitted by the transmitter 720 via the antenna 722b and received by the receiver 730 via the antenna 732b.

Similar to the system, the receiver 730 may provide the transmitter 720 with the duration 702, for example, in units of OFDM symbols. As an example, the duration 702 may include L symbols, where L may be 2, 3, or more. The receiver 730 may determine the duration 702 based on the receiver 730 implementations and/or the traffic type or application associated with the spatial streams 710 and 750. Mechanisms for exchanging or reporting intra-packet rate adaptation support are described in greater detail herein.

In an embodiment, the transmitter 720 includes a channel coding and rate matching unit 724, a constellation mapping unit 726, and a layer mapping and precoding unit 728. The channel coding and rate matching unit 724 is substantially similar to the channel coding and rate matching unit 624. The constellation mapping unit 726 is substantially similar to the constellation mapping unit 626. The layer mapping and precoding unit 728 is configured to perform spatial layer mapping and codebook precoding for MIMO transmissions. Layer mapping for MIMO transmissions can be performed based on various configurations. In an example, one codeword generated from one TB may be mapped to two spatial layers (e.g., the spatial streams 710 and 750) by splitting the codeword into odd and even symbols, mapping the odd symbols to one spatial layer and the even symbols to another spatial layer. In another example, two codewords each generated from one TB may be mapped to two spatial layers (e.g., the spatial streams 710 and 750), where each codeword is mapped to one of the spatial layers. In another example, two codewords each generated from one TB may be mapped to four spatial layers, where one codeword is mapped to two of the spatial layers by splitting into odd and even symbols and the other codeword is mapped to the other two spatial layers.

For simplicity of discussion, the mapping of two codewords to two spatial layers is described below. The transmitter 720 receives a first data packet or TB and a second data packet or TB from a higher layer. The first and second data packets are similar to the data packets 210 and 610. The channel coding and rate matching unit 724 generates a first codeword for the first TB and a second codeword for the second TB. The constellation mapping unit 726 maps each codeword to a block of modulation symbols. For example, the channel coding and rate matching unit 724 and the constellation mapping unit 726 generates a first block of modulation symbols with a MCS switchover from the MCS index 742 to 744 based on the first TB and generates a second block of modulation symbols with a MCS switchover from the MCS index 746 to 748 based on the second TB. The layer mapping and precoding unit 728 maps the first block of modulation symbols and the second block of modulation symbols to spatial layers and performs precoding. For example, the first block of modulation symbols generated from the first data packet may be mapped to the spatial stream 710 and the second block of modulation symbols generated from the second data packet may be mapped to the spatial stream 750.

As an example, the MCS index 742 corresponds to MCS index 4 (16-QAM with a code rate of ¾), the MCS index 744 corresponds to MCS index 5 (64-QAM with a code rate of ⅔), the MCS index 742 corresponds to MCS index 6 (64-QAM with a code rate of ¾), and the MCS index 744 corresponds to MCS index 7 (64-QAM with a code rate of ⅚) as shown in the table 300. For the first TB, the channel coding and rate matching unit 724 generates N1 coded bits from a portion of the first TB based on a ¾ code rate. The constellation mapping unit 726 maps the N1 code bits to 16-QAM modulation symbols, carried by the first L OFDM symbols (e.g., in the duration 712) of the spatial stream 710. The channel coding and rate matching unit 724 generates N2 coded bits from a remaining portion of the first TB based on a ⅔ code rate. The constellation mapping unit 726 maps the N2 code bits to 64-QAM modulation symbols, carried by remaining OFDM symbols of the spatial stream 710 in the duration 706.

Similarly, for the second TB, the channel coding and rate matching unit 724 generates N3 coded bits from a portion of the second TB based on a ¾ code rate. The constellation mapping unit 726 maps the N3 code bits to 64-QAM modulation symbols, carried by the first L OFDM symbols (e.g., in the duration 752) of the spatial stream 750. The channel coding and rate matching unit 724 generates N4 coded bits from a remaining portion of the second TB based on a ⅚ code rate. The constellation mapping unit 726 maps the N4 code bits to 64-QAM modulation symbols, carried by remaining OFDM symbols of the spatial stream 750 in the duration 606. While not shown, the transmitter 720 can include other units for performing CRC generation and attachment, scrambling, resource mapping, IFFT, and/or CP appending.

Upon receiving the communication signal 708, the receiver 730 may demodulate and/or decode the first L symbols of the spatial stream 710 based on the MCS index 742 and demodulate and/or decode the remaining symbols of the spatial stream 710 based on the MCS index 744. The receiver 730 may demodulate and/or decode the first L symbols of the spatial stream 750 based on the MCS index 746 and demodulate and/or decode the remaining symbols of the spatial stream 750 based on the MCS index 748. The receiver 730 may recover the two original data packets transmitted by the transmitter 720, each from one of the spatial streams 710 and 750.

In general, for any spatial multiplexing configuration, a MCS switchover can occur within each spatial stream after a duration of time. In some embodiments, the MST for each stream may be the same. In some other embodiments, the MST for each stream may be different.

While FIG. 7 illustrates that the same duration 702 is used for the MCS switchover for both spatial streams 710 and 750, in some embodiments, each spatial stream can have a different MST. For example, one spatial stream may switchover to a next MCS order after 2 symbols, while another spatial stream may switchover to a next MCS order after 3 symbols.

As can be observed from the plot 740, the MCS order is increased from m to (m+1) within the spatial stream 710 and the MCS order is increased from n to (n+1) for the spatial stream 750. Accordingly, the present disclosure can provide a higher data rate or capacity for MIMO transmissions by exploiting or taking advantage of receiver algorithm convergence.

Figure 8:
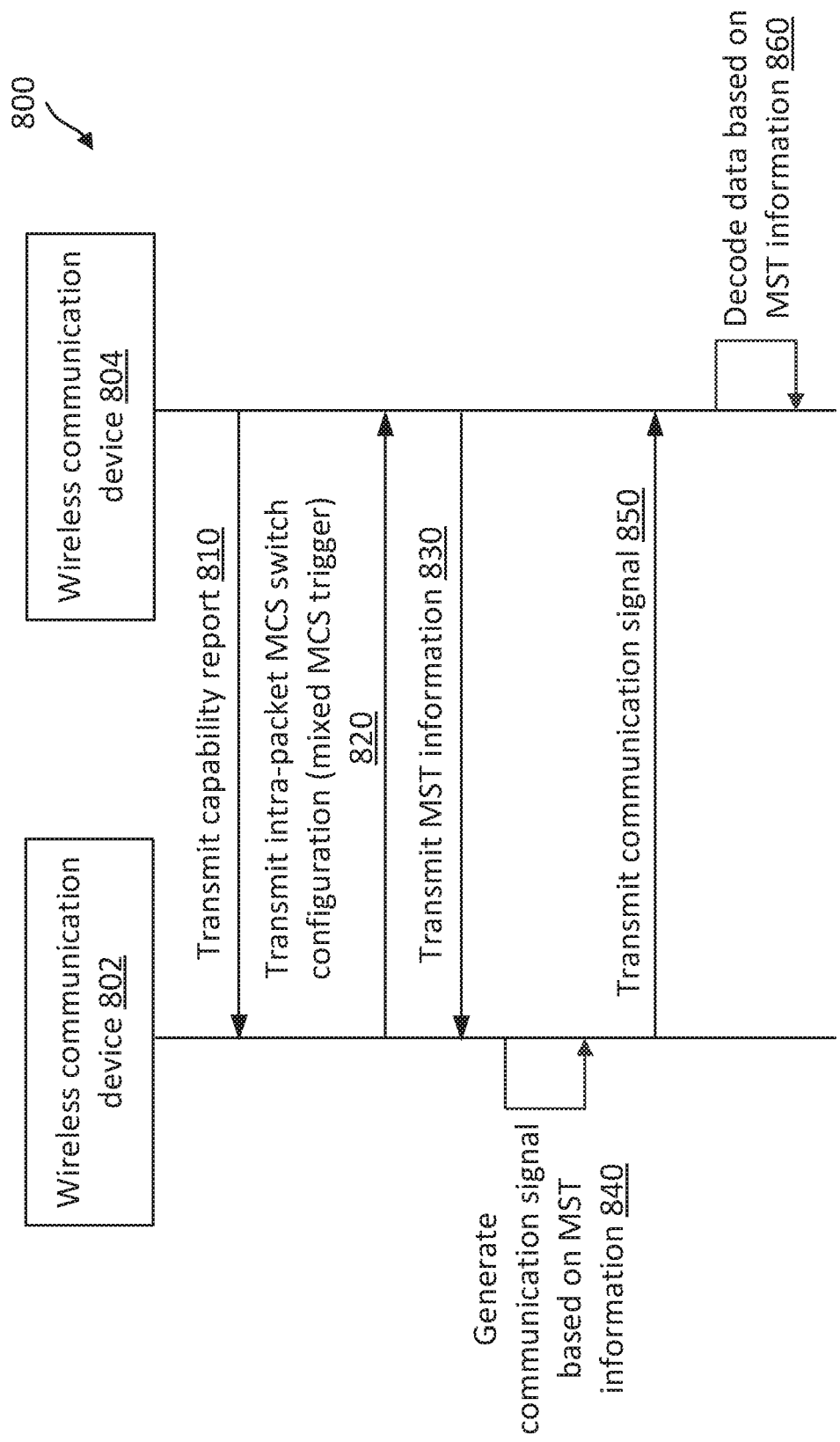
FIG. 8 illustrates a wireless communication system implementing intra-packet rate adaptation according to some embodiments of the present disclosure.

FIG. 8 is a signaling diagram illustrating an intra-packet rate adaptation method 800 according to some embodiments of the present disclosure. The method 800 is implemented between a wireless communication device 802 and a wireless communication device 804. The wireless communication device 802 may correspond to the transmitter 620 or 720 and the wireless communication device 804 may correspond to the receiver 630 or 730. For DL data communications, the wireless communication device 802 may correspond to one of the BSs 105 and 500 and the wireless communication device 804 may correspond to one of the UEs 115 and 400. For UL data communications, the wireless communication device 802 may correspond to one of the UEs 115 and 400 and the wireless communication device 804 may correspond to one of the BSs 105 and 500. Steps of the method 800 can be executed by computing devices (e.g., a processor, processing circuit, and/or other suitable component) of the BS and the UE. As illustrated, the method 800 includes a number of enumerated steps, but embodiments of the method 800 may include additional steps before, after, and in between the enumerated steps. In some embodiments, one or more of the enumerated steps may be omitted or performed in a different order. The method 800 may employ any similar intra-packet rate adaptation mechanisms in the systems 600 and 700 described above with respect to FIGS. 6 and 7, respectively.

At step 810, the wireless communication device 804 transmits a capability report indicating that the wireless communication device 804 is capable of receiving packets (e.g., the data packets 210, 610) and/or spatial streams (e.g., the streams 710 and 750) with an intra-packet MCS switchover or rate adaptation.

At step 820, the wireless communication device 802 transmits an intra-packet MCS switch configuration including a mixed MCS trigger to the wireless communication device 804. The mixed MCS trigger indicates that the wireless communication device 802 is intending to transmit data (e.g., the data packets 210 and 610 and the spatial streams 710 and 750) to the wireless communication device 804 with MCS switchover within a single transmission.

At step 830, the wireless communication device 804 transmits MST information to the wireless communication device 802. The MST information may indicate a duration or MST (e.g., the durations 202, 602 and 702) when the receiver's algorithms may converge and may have sufficient EVM to support a higher order MCS. For example, the wireless communication device 804 may indicate that X symbols are required to switch from a MCS order m to a MCS order (m+1) and Y symbols are required to switch from a MCS order n to a MCS order (n+1)

At step 840, the wireless communication device 802 generates a communication signal (e.g., the communication signals 608 and 708) from a data packet (e.g., received from a higher MAC layer) based on the MST information. For example, the wireless communication device 802 may select an initial MCS order based on channel measurements. The wireless communication device 802 may encode the data packet using the initial MCS order and switches over to a next MCS order based on the MST information, for example, by using similar mechanisms as the transmitter 620. For MIMO transmission, the wireless communication device 802 may select an initial MCS order and encode data with a MCS switchover per data packet and/or per stream, for example, by using similar mechanisms as the transmitter 720.

At step 850, the wireless communication device 802 transmits the generated communication signal to the wireless communication device 804. The communication signal includes the one or more the data packets each encoded with intra-packet rate adaptation. The number of data packets may depend on whether MIMO is used. In an embodiment, the communication signal may include a control portion and a data portion. The control portion (e.g., corresponding to a PDCCH) may include a scheduling grant indicating the initial MCS order. The data portion (e.g., corresponding to a PDSCH) may include the encoded data packets. In an embodiment, the data portion may include an indication (e.g., one bit) indicating whether a corresponding data packet is of a mixed-MCS packet type encoded with a MCS switchover.

At step 860, upon receiving the communication signal, the wireless communication device 804 decodes the data from the communication signal based on the MST information. For example, the wireless communication device 804 may decode a first few symbols of the communication signal based on the initial MCS order and subsequent symbols of the communication signal based on a next MCS order. For MIMO reception, the wireless communication device 804 may perform the decoding per stream (e.g., the streams 710 and 750) based on initial MCS order for a corresponding stream and a next MCS order after a MST (e.g. the durations 202, 602, and 702).

Figure 9:
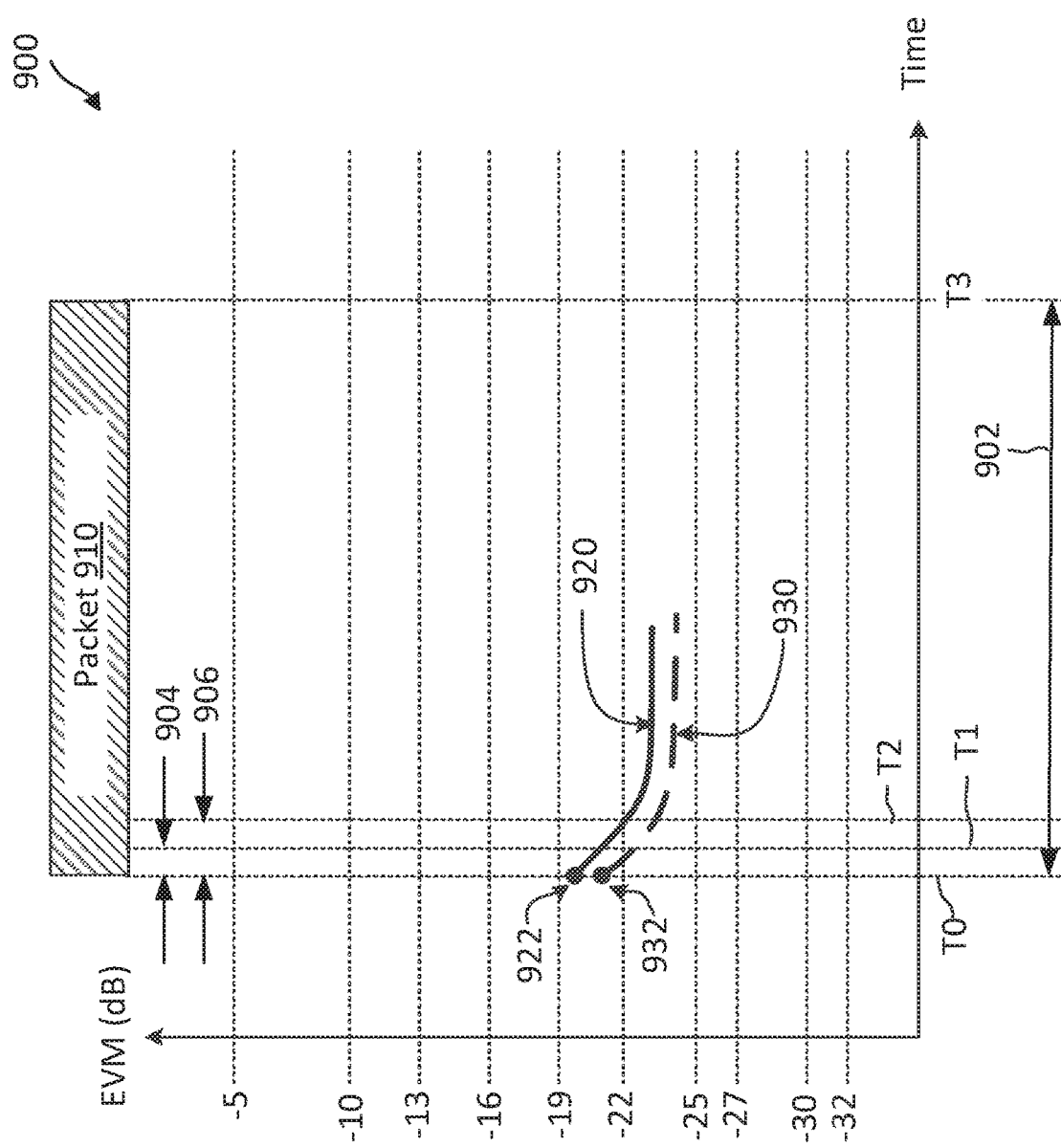
FIG. 9 is a graph illustrating MCS switchover time (MST) in relation to EVM according to some embodiments of the present disclosure.

FIG. 9 is a graph 900 illustrating MST in relation to EVM according to some embodiments of the present disclosure. In FIG. 9, the x-axis represents time in some constant units and the y-axis represents receive (RX) EVM in units of dB. In FIG. 9, a packet has a duration of 902 beginning at time T0 and ending at time T3. The plot 920 shows the EVM measured at a receiver during the reception of a packet 910 (e.g., the data packets 210 and 610 and/or spatial streams 710 and 750 carrying data) when the initial EVM 922 at the beginning of the reception (e.g., at time T0) is at about −20.5 dB. The plot 930 shows the EVM measured at a receiver during the reception of the packet 910 when the initial EVM 932 at the beginning of the reception (e.g., at time T0) is at about −21.5 dB. Referring to the table 300, based on the initial EVM of −20.5 dB or −21.5 dB, a transmitter may use a MCS index of 4. To switchover to a next MCS index of 5, a EVM of −22 dB is required. The plot 920 shows that the RX EVM is reduced to about −22 dB at time T2 after a duration 906 from the start of the reception, and thus the MST can be set to the duration 906. The plot 930 shows that the RX EVM reaches a EVM of about −22 dB at time T1 after a duration 906 from the start of the reception, and thus the MST can be set to the duration 906. Accordingly, the MST can be determined based on an initial RX EVM.

As can be observed, the duration 904 is shorter than the duration 906. Thus, an initial EVM of about −21.5 dB shown in the plot 930 can result in a higher data rate gain or improvement with the intra-packet rate adaptation than an initial EVM of about −20.5 dB shown in the plot 920.

Figure 10:
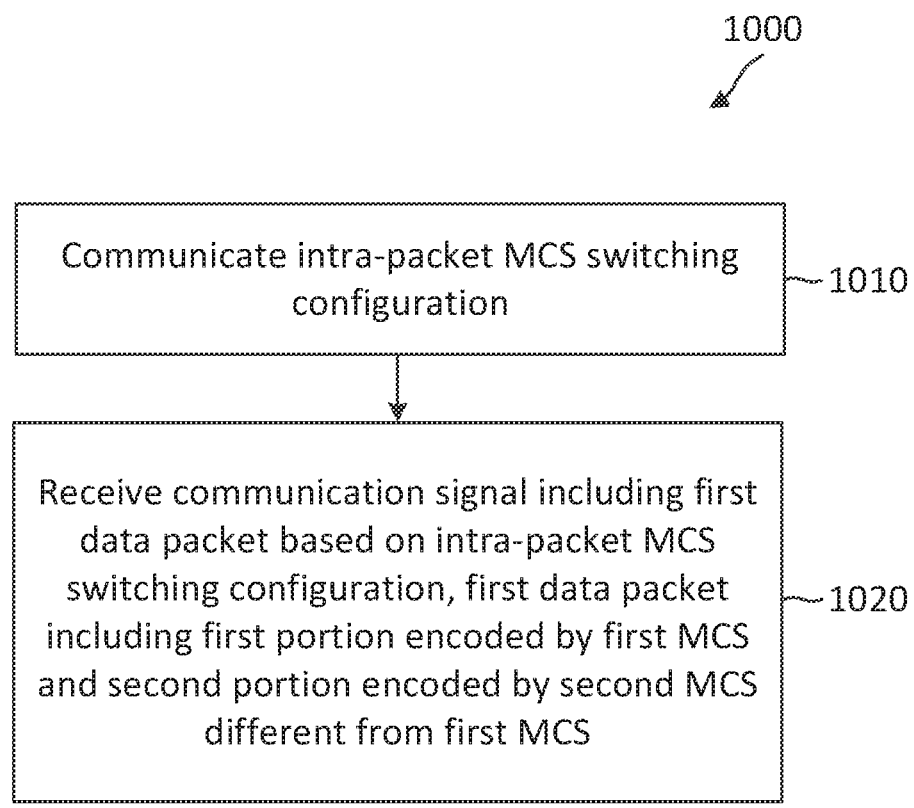
FIG. 10 is a flow diagram of an intra-packet rate adaptation method according to some embodiments of the present disclosure.

FIG. 10 is a flow diagram of an intra-packet rate adaptation method 1000 according to some embodiments of the present disclosure. Steps of the method 1000 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the intra-packet rate adaptation module 408, the transceiver 410, the modem 412, and the one or more antennas 416, to execute the steps of method 1000. Alternatively, a wireless communication device, such as the BS 105 or BS 500, may utilize one or more components, such as the processor 402, the memory 404, the intra-packet rate adaptation module 408, the transceiver 410, the modem 412, and the one or more antennas 416, to execute the steps of method 1000. Yet alternatively, the receiver 630, the receiver 730, or the wireless communication device 804 may include components or means to execute the steps of method 1000. The method 1000 may employ similar mechanisms as the systems 600 and 700 as described with respect to FIGS. 6 and 7, respectively, and the method 800 described with respect to FIG. 8. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes communicating, by a first wireless communication device with a second wireless communication device, an intra-packet MCS switching configuration.

At step 1020, the method 1000 includes receiving, by the first wireless communication device from the second wireless communication device, a communication signal including a first data packet (e.g., the data packet 210 or 610 or a data packet corresponding to the stream 710 or 750) based on the intra-packet MCS switching configuration. The first data packet including at least a first portion encoded by a first MCS and a second portion encoded by a second MCS different from the first MCS. The communication signal may be similar to the communication signals 608 and 708. The first data packet may be similar to the data packets 210 and 610 or the data packets corresponding to the streams 710 and 750.

In an embodiment, the second MCS has a higher MCS order (in terms of coding rate or modulation order) than the first MCS. In an example, the first MCS may correspond to the MCS index 642 and the second MCS may correspond to the MCS index 644. In an example, the first MCS may correspond to the MCS index 742 and the second MCS may correspond to the MCS index 744. In an example, the first MCS may correspond to the MCS index 746 and the second MCS may correspond to the MCS index 748.

In an embodiment, the communication signal further includes a second data packet, a third portion of the second data packet encoded by a third MCS and a fourth portion of the second data packet encoded by a fourth MCS including a higher MCS order than the third MCS. For example, the first MCS may correspond to the MCS index 742, the second MCS may correspond to the MCS index 744, the third MCS may correspond to the MCS index 746, and the fourth MCS may correspond to the MCS index 748. The first portion and the second portion are associated with a first MIMO stream (e.g., the stream 710). The third portion and the fourth portion are associated with a second MIMO stream (e.g., the stream 750) different from the first MIMO stream.

Figure 11:
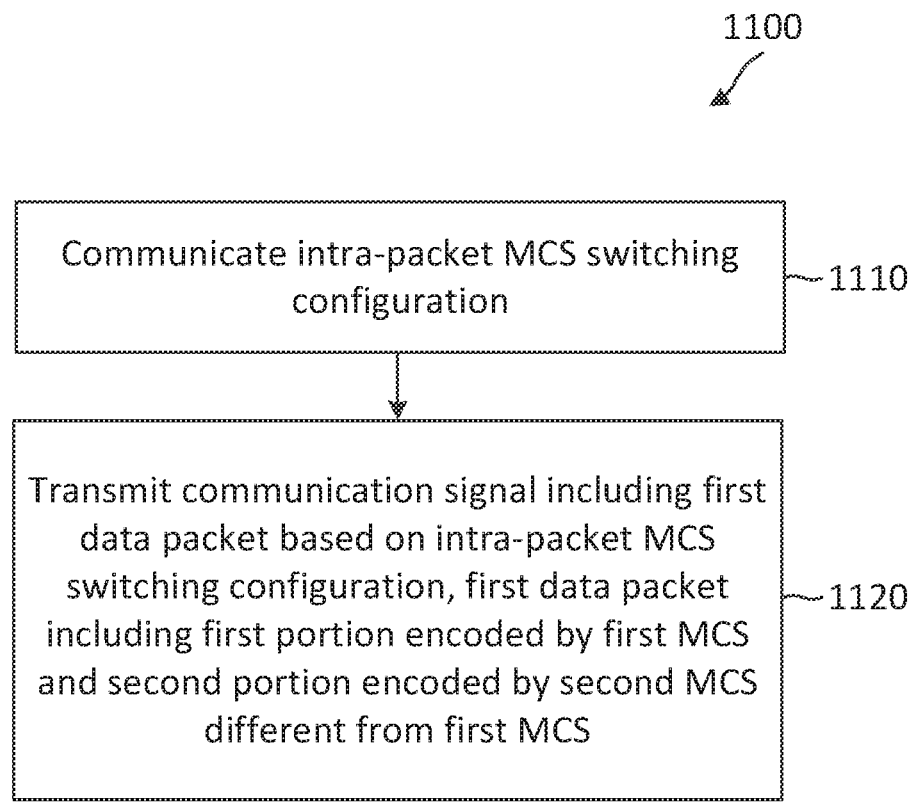
FIG. 11 is a flow diagram of an intra-packet rate adaptation method according to some embodiments of the present disclosure.

FIG. 11 is a flow diagram of an intra-packet rate adaptation method 1100 according to some embodiments of the present disclosure. Steps of the method 1100 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the intra-packet rate adaptation module 408, the transceiver 410, the modem 412, and the one or more antennas 416, to execute the steps of method 1100. Alternatively, a wireless communication device, such as the BS 105 or BS 500, may utilize one or more components, such as the processor 402, the memory 404, the intra-packet rate adaptation module 408, the transceiver 410, the modem 412, and the one or more antennas 416, to execute the steps of method 1000. Yet alternatively, the transmitter 620, the transmitter 720, or the wireless communication device 802 may include components or means to execute the steps of method 1100. The method 1100 may employ similar mechanisms as the systems 600 and 700 as described with respect to FIGS. 6 and 7, respectively, and the method 800 described with respect to FIG. 8. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes communicating, by a first wireless communication device with a second wireless communication device, an intra-packet MCS switching configuration.

At step 1120, the method 1100 includes transmitting, by the first wireless communication device to the second wireless communication device, a communication signal including a first data packet (e.g., the data packet 210 or 610 or a data packet corresponding to the stream 710 or 750) based on the intra-packet MCS switching configuration. The first data packet including at least a first portion encoded by a first MCS and a second portion encoded by a second MCS different from the first MCS. The communication signal may be similar to the communication signals 608 and 708. The first data packet may be similar to the data packets 210 and 610 or the data packets corresponding to the streams 710 and 750.

In an embodiment, the second MCS has a higher MCS order (in terms of coding rate or modulation order) than the first MCS. In an example, the first MCS may correspond to the MCS index 642 and the second MCS may correspond to the MCS index 644. In an example, the first MCS may correspond to the MCS index 742 and the second MCS may correspond to the MCS index 744. In an example, the first MCS may correspond to the MCS index 746 and the second MCS may correspond to the MCS index 748.

In an embodiment, the communication signal further includes a second data packet, a third portion of the second data packet encoded by a third MCS and a fourth portion of the second data packet encoded by a fourth MCS including a higher MCS order than the third MCS. For example, the first MCS may correspond to the MCS index 742, the second MCS may correspond to the MCS index 744, the third MCS may correspond to the MCS index 746, and the fourth MCS may correspond to the MCS index 748. The first portion and the second portion are associated with a first MIMO stream (e.g., the stream 710). The third portion and the fourth portion are associated with a second MIMO stream (e.g., the stream 75) different from the first MIMO stream.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, an intra-packet modulation coding scheme (MCS) switching configuration indicating a duration from a beginning of a first data packet to a time within the first data packet for switching from a first MCS to a second MCS, the first MCS being different from the second MCS; and
receiving, by the first wireless communication device from the second wireless communication device, a communication signal including the first data packet based on the intra-packet MCS switching configuration, the first data packet including at least a first portion corresponding to the duration encoded by the first MCS and a second portion encoded by the second MCS different from the first MCS.

2. The method of claim 1, further comprising:
transmitting, by the first wireless communication device to the second wireless communication device, an indication indicating that the first wireless communication device is capable of switching from the first MCS to the second MCS within the first data packet.

3. The method of claim 1, further comprising:
receiving, by the first wireless communication device from the second wireless communication device, an indication indicating that the first data packet is transmitted based on a switch from the first MCS to the second MCS.

4. The method of claim 1, wherein the communicating includes:
transmitting, by the first wireless communication device to the second wireless communication device, the intra-packet MCS switching configuration.

5. The method of claim 1, further comprising:
determining, by the first wireless communication device, the duration for switching from the first MCS to the second MCS based on an error vector magnitude (EVM) parameter associated with the first wireless communication device.

6. The method of claim 1, wherein the receiving includes:
receiving, by the first wireless communication device from the second wireless communication device, the first portion encoded by the first MCS; and
receiving, by the first wireless communication device from the second wireless communication device after receiving the first portion, the second portion encoded by the second MCS including a higher MCS order than the first MCS.

7. The method of claim 6, wherein the receiving further includes:
receiving, by the first wireless communication device from the second wireless communication device, a third portion of a second data packet encoded by a third MCS; and
receiving, by the first wireless communication device from the second wireless communication device after receiving the third portion, a fourth portion of the second data packet encoded by a fourth MCS including a higher MCS order than the third MCS,
wherein the first portion and the second portion are associated with a first multiple-input multiple-output (MIMO) stream, and
wherein the third portion and the fourth portion are associated with a second MIMO stream different from the first MIMO stream.

8. The method of claim 1, wherein the receiving includes:
receiving, by the first wireless communication device from the second wireless communication device, the communication signal indicating a switch from the first MCS to the second MCS within the first data packet.

9. The method of claim 1, further comprising:
decoding, by the first wireless communication device, the first portion of the first data packet based on the first MCS; and
decoding, by the first wireless communication device, the second portion of the first data packet based on the second MCS.

10. A method of wireless communication, comprising:
communicating, by a first wireless communication device with a second wireless communication device, an intra-packet modulation coding scheme (MCS) switching configuration indicating a duration from a beginning of a first data packet to a time within the first data packet for switching from a first MCS to a second MCS, the first MCS being different from the second MCS; and
transmitting, by the first wireless communication device to the second wireless communication device, a communication signal including the first data packet based on the intra-packet MCS switching configuration, the first data packet including at least a first portion corresponding to the duration encoded by the first MCS and a second portion encoded by the second MCS different from the first MCS.

11. The method of claim 10, further comprising:
receiving, by the first wireless communication device from the second wireless communication device, an indication indicating that the second wireless communication device is capable of switching from the first MCS to the second MCS within the first data packet.

12. The method of claim 10, further comprising:
transmitting, by the first wireless communication device to the second wireless communication device, an indication indicating that the first data packet is transmitted based on a switch from the first MCS to the second MCS.

13. The method of claim 10, further comprising:
receiving, by the first wireless communication device from the second wireless communication device, the intra-packet MCS switching configuration.

14. The method of claim 10, further comprising:
encoding, by the first wireless communication device, the first portion of the first data packet using the first MCS; and
switching, by the first wireless communication device, to encode the second portion of the first data packet using the second MCS based on the duration indicated by the intra-packet MCS switching configuration.

15. The method of claim 10, wherein the transmitting includes:
transmitting, by the first wireless communication device to the second wireless communication device, the first portion encoded by the first MCS; and
transmitting, by the first wireless communication device to the second wireless communication device after transmitting the first portion, the second portion encoded by the second MCS including a higher MCS order than the first MCS.

16. The method of claim 15, wherein the transmitting further includes:
transmitting, by the first wireless communication device to the second wireless communication device, a third portion of a second data packet encoded by a third MCS; and
transmitting, by the first wireless communication device to the second wireless communication device after receiving the third portion, a fourth portion of the second data packet encoded by a fourth MCS including a higher MCS order than the third MCS,
wherein the first portion and the second portion are associated with a first multiple-input multiple-output (MIMO) stream, and
wherein the third portion and the fourth portion are associated with a second MIMO stream different from the first MIMO stream.

17. The method of claim 10, wherein the transmitting includes:
transmitting, by the first wireless communication device from the second wireless communication device, the communication signal indicating a switch from the first MCS to the second MCS within the first data packet.

18. An apparatus comprising:
a transceiver configured to:
communicate, with a wireless communication device, an intra-packet modulation coding scheme (MCS) switching configuration indicating a duration from a beginning of a first data packet to a time within the first data packet for switching from a first MCS to a second MCS, the first MCS being different from the second MCS; and
receive, from the wireless communication device, a communication signal including the first data packet based on the intra-packet MCS switching configuration, the first data packet including at least a first portion corresponding to the duration encoded by the first MCS and a second portion encoded by the second MCS different from the first MCS.

19. The apparatus of claim 18, wherein the transceiver is further configured to:

transmit, to the wireless communication device, an indication indicating that the apparatus is capable of switching from the first MCS to the second MCS within the first data packet.

20. The apparatus of claim 18, wherein the transceiver is further configured to:
receive, from the wireless communication device, an indication indicating that the first data packet is transmitted based on a switch from the first MCS to the second MCS.

21. The apparatus of claim 18, wherein the transceiver is further configured to communicate the intra-packet MCS switch configuration by:
transmitting, to the wireless communication device, the intra-packet MCS switching configuration.

22. The apparatus of claim 18, further comprising:
a processor configured to determine the duration for switching from the first MCS to the second MCS based on an error vector magnitude (EVM) parameter associated with the apparatus.

23. The apparatus of claim 18, wherein the transceiver is further configured to transmit the communication signal by:
receiving, from the wireless communication device, the first portion encoded by the first MCS; and
receiving, from the wireless communication device after receiving the first portion, the second portion encoded by the second MCS including a higher MCS order than the first MCS.

24. The apparatus of claim 23, wherein the transceiver is further configured to transmit the communication signal by:
receiving, from the wireless communication device, a third portion of a second data packet encoded by a third MCS; and
receiving, from the wireless communication device after receiving the third portion, a fourth portion of the second data packet encoded by a fourth MCS including a higher MCS order than the third MCS, and
wherein the first portion and the second portion are associated with a first multiple-input multiple-output (MIMO) stream, and
wherein the third portion and the fourth portion are associated with a second MIMO stream different from the first MIMO stream.

25. An apparatus comprising:
a transceiver configured to:
communicate, with a wireless communication device, an intra-packet modulation coding scheme (MCS) switching configuration indicating a duration from a beginning of a first data packet to a time within the first data packet for switching from a first MCS to a second MCS, the first MCS being different from the second MCS; and
transmit, to the wireless communication device, a communication signal including the first data packet based on the intra-packet MCS switching configuration, the first data packet including at least a first portion corresponding to the duration encoded by the first MCS and a second portion encoded by the second MCS different from the first MCS.

26. The apparatus of claim 25, wherein the transceiver is further configured to:
receive, from the wireless communication device, an indication indicating that the wireless communication device is capable of switching from the first MCS to the second MCS within the first data packet.

27. The apparatus of claim 25, wherein the transceiver is further configured to:
transmit, to the wireless communication device, an indication indicating that the first data packet is transmitted based on a switch from the first MCS to the second MCS.

28. The apparatus of claim 25, wherein the transceiver is further configured to communicate the intra-packet MCS switch configuration by:
receiving, from the wireless communication device, the intra-packet MCS switching configuration.

29. The apparatus of claim 25, wherein the transceiver is further configured to transmit the communication signal by:
transmitting, to the wireless communication device, the first portion encoded by the first MCS; and
transmitting, to the wireless communication device after transmitting the first portion, the second portion encoded by the second MCS including a higher MCS order than the first MCS.

30. The apparatus of claim 29, wherein the transceiver is further configured to transmit the communication signal by:
transmitting, to the wireless communication device, a third portion of a second data packet encoded by a third MCS; and
transmitting, to the wireless communication device after receiving the third portion, a fourth portion of the second data packet encoded by a fourth MCS including a higher MCS order than the third MCS,
wherein the first portion and the second portion are associated with a first multiple-input multiple-output (MIMO) stream, and
wherein the third portion and the fourth portion are associated with a second MIMO stream different from the first MIMO stream.

* * * * *